(12) United States Patent
Majmundar et al.

(10) Patent No.: US 11,678,214 B2
(45) Date of Patent: *Jun. 13, 2023

(54) CONFIGURATION AND RECONFIGURATION OF AGGREGATED BACKHAUL BEARERS IN A MULTI-HOP INTEGRATED ACCESS BACKHAUL NETWORK FOR 5G OR OTHER NEXT GENERATION NETWORK

(71) Applicant: AT&T Intellectual Property I, L.P., Atlanta, GA (US)

(72) Inventors: Milap Majmundar, Austin, TX (US); Thomas Novlan, Cedar Park, TX (US); Andrew Thornburg, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,174

(22) Filed: Jun. 11, 2021

(65) Prior Publication Data

US 2021/0306897 A1 Sep. 30, 2021

Related U.S. Application Data

(63) Continuation of application No. 16/356,679, filed on Mar. 18, 2019, now Pat. No. 11,057,791.

(Continued)

(51) Int. Cl.
*H04W 28/02* (2009.01)
*H04W 92/20* (2009.01)

(52) U.S. Cl.
CPC ... *H04W 28/0205* (2013.01); *H04W 28/0247* (2013.01); *H04W 28/0284* (2013.01); *H04W 92/20* (2013.01)

(58) Field of Classification Search
CPC .................................................. H04W 28/0205
See application file for complete search history.

(56) References Cited

U.S. PATENT DOCUMENTS 9,351,192 B2 5/2016 Wang et al.
9,755,726 B2 9/2017 Balachandran et al.
(Continued)

FOREIGN PATENT DOCUMENTS

WO 2015139729 A1 9/2015
WO 2019/194737 A1 10/2019

OTHER PUBLICATIONS (3GPP TSG-RAN WG3 Meeting #101; R3-184930 ;Gothenburg, Sweden, Aug. 20-24, 2018; Agenda Item: 24.1.2.2; Source: Ericsson; Title: TP to TR 38.874 on QoS Handling for the Adaptation layer above RLC layer; Document for: pCR to TR 38.874) (Year: 2018).*

(Continued)

*Primary Examiner* — Abdeltif Ajid
(74) *Attorney, Agent, or Firm* — Amin, Turocy & Watson, LLP

(57) ABSTRACT

In a 5G network, an integrated access and backhaul (IAB) deployment in a 5G network, can enable aggregation of multiple user equipment (UE) bearers into backhaul bearers based on factors such as route information of UE bearers and quality of service of UE bearers. Additionally, reconfiguration of backhaul bearers, based on triggers, such as route changes for UE bearers can increase network efficiency for a 5G or other next generation network.

20 Claims, 13 Drawing Sheets

Related U.S. Application Data

(60) Provisional application No. 62/752,555, filed on Oct. 30, 2018.

(56) References Cited

U.S. PATENT DOCUMENTS

| | | | |
|---|---|---|---|
| 9,780,997 | B2 | 10/2017 | Grinshpun et al. |
| 9,781,610 | B2 | 10/2017 | Das et al. |
| 9,974,052 | B2 | 5/2018 | Wang et al. |
| 10,015,832 | B2 | 7/2018 | Zhang et al. |
| 10,028,328 | B2 | 7/2018 | Kwon |
| 10,028,331 | B2 | 7/2018 | Fujishiro et al. |
| 10,034,221 | B2 | 7/2018 | Cao et al. |
| 10,050,894 | B2 | 8/2018 | Karaki et al. |
| 2003/0131121 | A1* | 7/2003 | Quittek ............... H04L 41/0896 709/232 |
| 2011/0194535 | A1* | 8/2011 | Johansson ............ H04W 28/24 370/329 |
| 2015/0029913 | A1 | 1/2015 | Zhou et al. |
| 2016/0119939 | A1 | 4/2016 | Himayat et al. |
| 2016/0192266 | A1 | 6/2016 | Dai et al. |
| 2017/0006499 | A1 | 1/2017 | Hampel et al. |
| 2017/0013529 | A1* | 1/2017 | Persson ................ H04W 36/30 |
| 2017/0064731 | A1 | 3/2017 | Wang et al. |
| 2017/0188253 | A1 | 6/2017 | Bergstrom et al. |
| 2017/0311251 | A1 | 10/2017 | Liu et al. |
| 2017/0331670 | A1 | 11/2017 | Parkvall et al. |
| 2018/0027524 | A1 | 1/2018 | Zhang et al. |
| 2018/0063014 | A1 | 3/2018 | Yu et al. |
| 2018/0092139 | A1 | 3/2018 | Novlan et al. |
| 2018/0192412 | A1 | 7/2018 | Novlan et al. |
| 2018/0270875 | A1 | 9/2018 | Hampel et al. |
| 2018/0279188 | A1 | 9/2018 | Tenny et al. |
| 2019/0223078 | A1 | 7/2019 | Sirotkin et al. |
| 2019/0289492 | A1 | 9/2019 | Hampel et al. |
| 2019/0372887 | A1 | 12/2019 | Majmundar et al. |
| 2020/0015147 | A1 | 1/2020 | Malkamaki et al. |
| 2020/0036484 | A1 | 1/2020 | Kim |
| 2021/0127430 | A1 | 4/2021 | Teyeb et al. |

OTHER PUBLICATIONS

AT&T, et al. "Study on Integrated Access and Backhaul for NR." 8881123GPP TSG RAN Meeting #75, Dubrovnik, Croatia, Mar. 6-9, 2017. 5 pages.

3rd Generation Partnership Project. "3GPP TR 38.874 V0.4.0 (Aug. 2018): Study on Integrated Access and Backhaul." 3GPP, Aug. 2018. 55 pages.

International Search Report and Written Opinion received for PCT Application Serial No. PCT/US2019/054814 dated Dec. 9, 2019, 14 pages.

Ericsson et al., "Way Forward on Bearer Mapping for IAB Network", URL : http://www.3gpp.org/ftp/tsg%5Fran/WG2%5FRL2/TSGR2%5F103bis/Docs/R2%2D18143642Ezip, Sep. 27, 2018, 20 pages.

ZTE., "Discussion on QoS and bearer mapping for IAB", URL : http://www.3gpp.org/ftp/tsg%5Fran/WG2%5FRL2/TSGR2%5F102/Docs, May 11, 2018, 20 pages.

Ericsson, "TP to TR 38.874 on QoS Handling for the Adaptation layer above RLC layer", URL : http://www.3gpp.org/ftpjtsg%5Fran/WG3%5Fiu/TSGR3%5F101/Docs/R3%2D184930%2Ezip, Aug. 10, 2018, 20 pages.

Catt, "Bearer Mapping and QoS handling in IAB architecture", URL : http://www.3gpp.orgjftp/tsg%5Fran/WG2%5FRL2/TSGR2%5F103/Docs/R2%2D1811857%2Ezip, Aug. 10, 2018, 20 pages.

ZTE, "Discussion on user plane bearer mapping and comparison", URL : http://www.3gpp.org/ftp/tsg%5Fran/WG2%5FRL2/TSGR2%5F103bis/Docs/R2%2D1814723%2Ezip, Sep. 28, 2018, 20 pages.

Office Action for U.S. Appl. No. 16/356,679 dated Sep. 17, 2020, 37 pages.

Non-Final Office Action received for U.S. Appl. No. 16/295,938 dated Aug. 5, 2020, 39 pages.

Hampel et al. U.S. Appl. No. 62/645,095 for QOS Support in Wireless Backhaul Networks Using Cellular Radio-Access Technologies filed Mar. 19, 2018, 37 pages.

Sirotkin et al. U.S. Appl. No. 62/649,295 for Routing Using Integrated Access and Backhaul (IAB) in New Radio (NR) Systems filed Mar. 28, 2018. 55 pages.

"Adaptation layer in MT", Qualcomm Incorporated, 3GPP TSG-RAN WG2 Meeting #103bis, Chengdu, China, Oct 8-12, 2018. 8 pages.

"3rd Generation Partnership Project; Technical Specification Group Radio Access Network; Study on Integrated Access and Backhaul; (Release 15)" 3GPP, 3GPP TR 38.874 V0.5.0 (Oct. 2018), 78 pages.

Notice of Allowance dated Mar. 1, 2021 for U.S. Appl. No. 16/356,679, 26 pages.

Office Action dated Jul. 6, 2022 for U.S. Appl. No. 17/179,120, 47 pages.

Notice of Allowance dated Nov. 9, 2022 for U.S. Appl. No. 17/179,120, 50 pages.

* cited by examiner

CONFIGURATION AND RECONFIGURATION OF AGGREGATED BACKHAUL BEARERS IN A MULTI-HOP INTEGRATED ACCESS BACKHAUL NETWORK FOR 5G OR OTHER NEXT GENERATION NETWORK

RELATED APPLICATIONS

The subject patent application is a continuation of, and claims priority to, U.S. patent application Ser. No. 16/356,679 (now U.S. Pat. No. 11,057,791), filed Mar. 18, 2019, and entitled "CONFIGURATION AND RECONFIGURATION OF AGGREGATED BACKHAUL BEARERS IN A MULTI-HOP INTEGRATED ACCESS BACKHAUL NETWORK FOR 5G OR OTHER NEXT GENERATION NETWORK," which claims the benefit of priority to U.S. Provisional Patent Application No. 62/752,555, filed Oct. 30, 2018 and titled "CONFIGURATION AND RECONFIGURATION OF AGGREGATED BACKHAUL BEARERS IN A MULTI-HOP INTEGRATED ACCESS BACKHAUL NETWORK FOR 5G OR OTHER NEXT GENERATION NETWORK," the entireties of which applications are incorporated herein by reference.

TECHNICAL FIELD

This disclosure relates generally to facilitating configuration and reconfiguration of aggregated backhaul bearers for a 5G new radio (NR) networks. For example, this disclosure relates to configuration and reconfiguration of aggregated backhaul bearers in a multi-hop integrated access backhaul network for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating configuration and reconfiguration of aggregated backhaul bearers is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
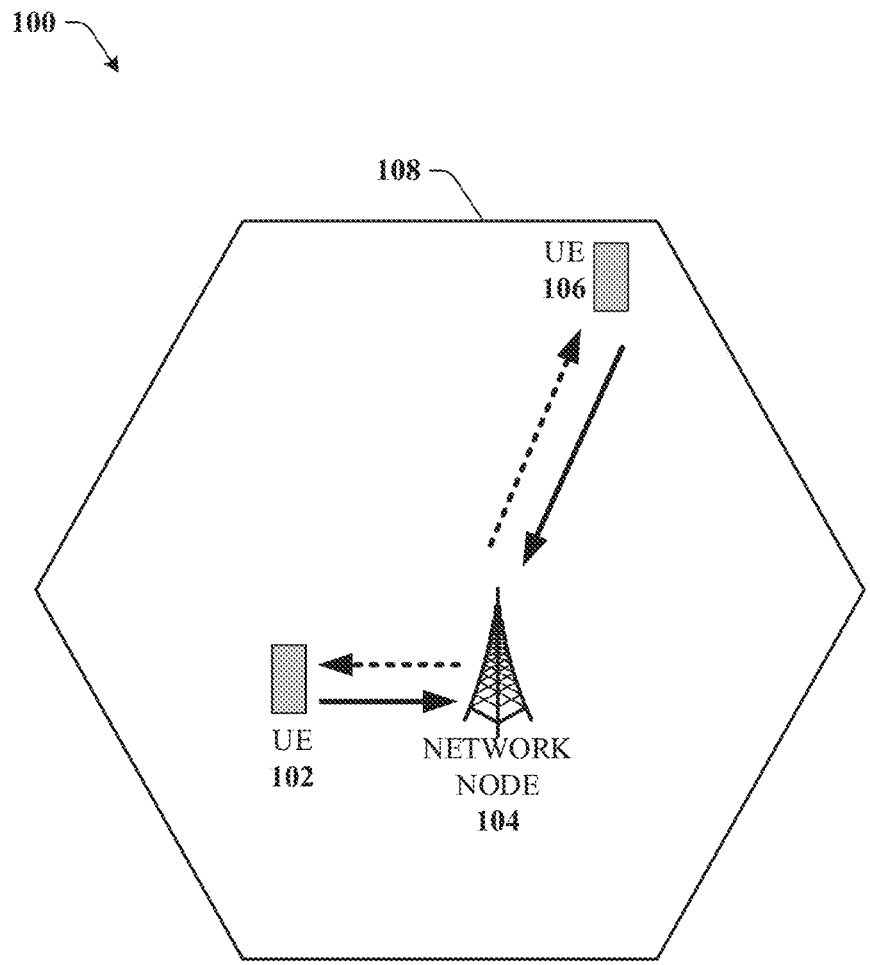
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate configuration and reconfiguration of aggregated backhaul bearers for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate configuration and reconfiguration of aggregated backhaul bearers for a 5G network. Facilitating operation of integrated access backhaul under a non-standalone network architecture for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Topology management can comprise the following characteristics: 1) happens on long time scales; 2) manages static hop order; 3) handles initial access of relay nodes; and/or 4) changes every time a node is added or removed. Alternatively, route management can happen at a much faster time scale (e.g., happens over 10 seconds, or 100s of milliseconds) and routes are updated for load variance and blocking. Depending on the network architecture, the scheduling of backhaul links can be performed by a central node (e.g., an aggregation point) or can be distributed across multiple nodes, requiring coordination of resource allocation and/or route selection information. For densely deployed mmWave NR systems, the area covered by an NR node can be small, so a dense deployment of NR nodes in a given area can require a larger number of deployment sites. When an integrated access backhaul (IAB) is deployed in such an environment with sparse fiber deployment, the large number of deployment sites can create a deployment where multiple IAB hops can be utilized to reach the IAB donor node (e.g., IAB donor has access to fiber). This means that for each UE bearer, a particular route through the multi-hop network can be determined. Moreover, when channel or network conditions change dynamically, the route through the multi-hop IAB network can also change.

Furthermore, data from multiple UE bearers can be aggregated into common backhaul bearers that are established between two IAB nodes. Such backhaul bearers can be referred to as radio link control (RLC) channels. In this disclosure, three specific solutions are proposed. The first solution comprises a configuration of many-to-one aggregated backhaul bearers between IAB nodes based on one or more factors, including routing information, quality of service (QoS), etc. of the UE bearers that are aggregated into the backhaul bearers. The second solution can comprise enforcement of aggregation policies, and the third solution can comprise reconfiguration of already established aggregated backhaul bearers, based on mobility events and radio resource management (RRM) triggers such as route changes, link failures, etc. in the IAB network.

Donor units (DU) and relay DUs (IAB Node) can be connected by a relay link between the two. UEs can send data from the relay link to the DU. Each UE can send this data, or the data can be aggregated. For example, if UE1 and UE2 have a similar type of service, then the packets of the UEs can be aggregated on the same relay bearer. UEs with similar types of services can have their data aggregated. Alternatively, UE bearers that will be sending data to the same set of access nodes can have their data aggregated as well. Thus, aggregation can be based on routing decisions. Aggregation can also depend on reconfiguration and/or local congestion conditions of the bearer or the IAB node. For example, if some things in the network change, then the bearer aggregation can be reconfigured.

Each of the IAB nodes can require routing information related to each of the UE bearers in order to decide which other UE bearer is suitable to aggregate with another UE bearer. If there is a centralized routing entity, the routing entity can enforce aggregation policies for IAB nodes. Thus, it can provide guidance to the IAB nodes through an orchestration entity or a control plane interface. For example, the centralized routing entity can ensure that certain aggregation policies are enforced. Policies can also change, over time, based on network or traffic conditions (e.g., more bearer aggregation, less bearer aggregation, static bearer aggregation). The centralized routing entity can also consider the total mix of different quality of class of bearers in the network. For example, if there are a lot of high quality class UEs, then the centralized routing entity may want the lower quality of service class bearers to be aggregated more so than the higher quality class bearers. Individual IAB nodes can also trigger topology changes to maintain a certain performance. For example, if an IAB node realizes that it cannot sustain a certain quality of service, then a topology change can help alleviate the load of that IAB node, which can then trigger the centralized routing entity to reevaluate the topology and/or enforce a change. In another embodiment, if one of the UEs performs a handover, then the system can reconfigure how the UE bearers are aggregated into backhaul bearers because one of the UEs that was aggregated into one backhaul bearer has now moved to a different node that can be better aggregated with another UE.

In one embodiment, described herein is a method comprising receiving, by a wireless network device comprising a processor, first data from a first mobile device of a wireless network via a first mobile device bearer channel. The method can also comprise receiving, by the wireless network device, second data from a second mobile device of the wireless network via a second mobile device bearer channel. Additionally, in response to the receiving the first data from the first mobile device and the receiving the second data from the second mobile device, the method can comprise aggregating, by the wireless network device, the first data and the second data, resulting in aggregated data for a backhaul bearer of the wireless network, wherein the aggregating the first data and the second data is based on a first condition associated with a quality of service of the first mobile device bearer channel being determined to have been satisfied and a second condition associated with a data route of the first data being determined to have been satisfied.

According to another embodiment, a system can facilitate, receiving first data from a first mobile device via a first bearer channel of a wireless network. The system can also comprise receiving second data from a second mobile device via a second bearer channel of the wireless network. Additionally, in response to the receiving the first data from the first mobile device and the receiving the second data from the second mobile device, and in response to an aggregation condition associated with a routing pattern and a quality of service being determined to have been satisfied, the system can comprise aggregating the first data and the second data, resulting in aggregated data for use in connection with a backhaul bearer of the wireless network.

According to yet another embodiment, described herein is a machine-readable storage medium that can perform the operations comprising receiving first data from a first mobile device via a first bearer channel. The machine-readable storage medium can perform the operations comprising receiving second data from a second mobile device via a second bearer channel. Furthermore, in response to the receiving the first data from the first mobile device and the receiving the second data from the second mobile device and in response to a routing condition and a quality of service of the second bearer channel being determined to have been satisfied, the machine-readable storage medium can perform the operations comprising aggregating the first data and the second data, resulting in aggregated data to be utilized by a backhaul bearer.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
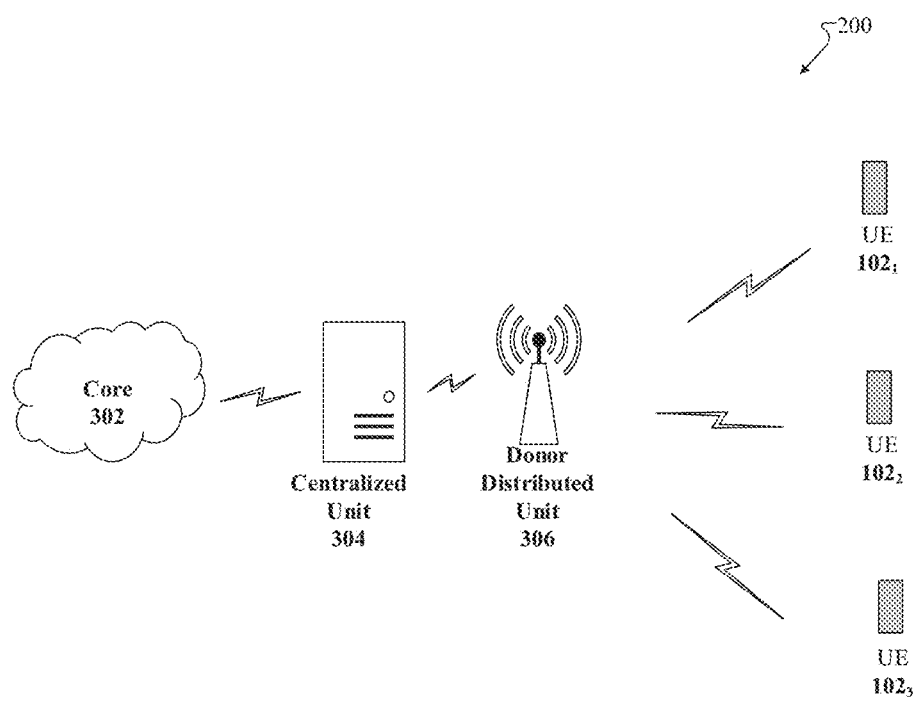
FIG. 2 illustrates an example schematic system block diagram of a new radio access architecture according to one or more embodiments.

Referring now to FIG. 2, illustrated is an example schematic system block diagram of a new radio access architecture according to one or more embodiments. 3GPP NR-based 5G mobile networks can be deployed using a split RAN protocol architecture such that on the user plane the packet data convergence protocol (PDCP) sublayers can reside at a centralized unit (CU), while the RLC, media access control (MAC), and physical layer (PHY) layers can reside at the distributed unit (DU). User plane data can be carried on data radio bearers (DRBs) that traverse the above described user plane RAN protocol architecture. On the control plane, signaling radio bearers (SRBs) can be set up to carry control messages from the RRC layer, also utilize the PDCP layer at the CU, and further carry the control messages down through the RLC, MAC, and PHY layers at the DU to be delivered to the UE over the air interface. Each network user can be allocated multiple DRBs and SRBs by the network. The network interface between the CU and DU can be called the F1 interface per 3GPP specifications.

Figure 3:
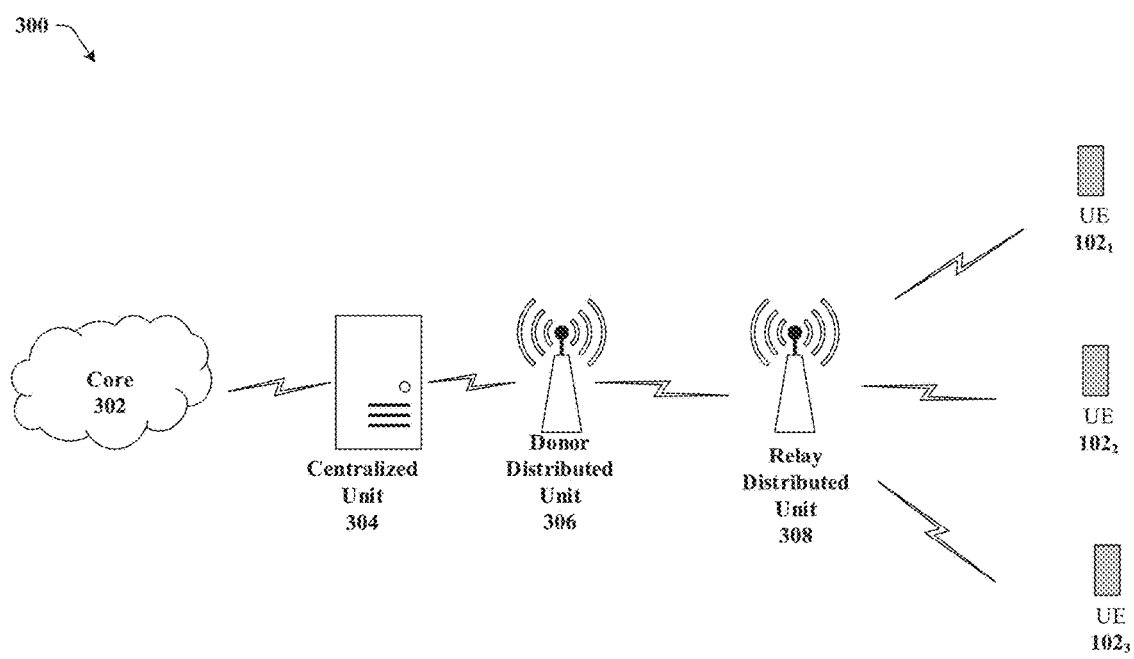
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. An IAB feature can enable future cellular network deployment scenarios and applications to support wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g. beam-based operation). Thus, FIG. 3 illustrates a generic IAB setup comprising a core network 302, a centralized unit 304, donor distributed unit 306, relay distributed unit 308, and UEs $102_1$, $102_2$, $102_3$. The donor distributed unit 306 (e.g., access point) can have a wired backhaul with a protocol stack and can relay the user traffic for the UEs $102_1$, $102_2$, $102_3$ across the IAB and backhaul link. Then, the relay distributed unit 308 can take the backhaul link and convert it into different strains for the connected UEs $102_1$, $102_2$, $102_3$. Although FIG. 3 depicts a single hop (e.g., over the air), it should be noted that multiple backhaul hops can occur in other embodiments.

Figure 4:
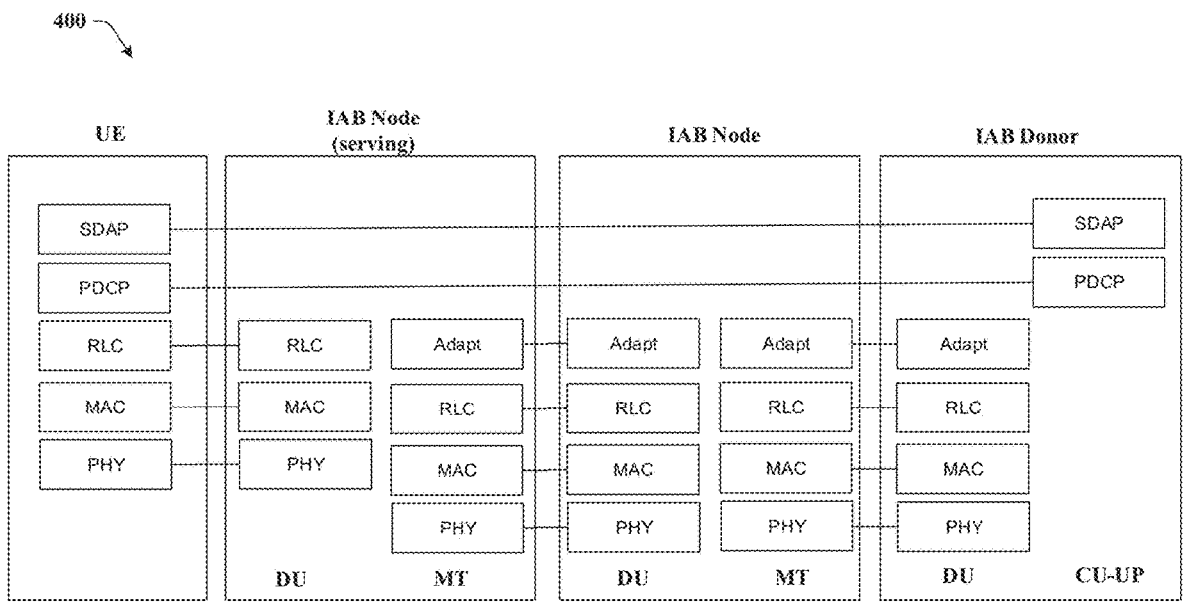
FIG. 4 illustrates an example schematic system block diagram of a user plane protocol stack for a multi-hop integrated access backhaul relay scenario according to one or more embodiments.

Referring now to FIG. 4, illustrated is an example schematic system block diagram of a user plane protocol stack for a multi-hop integrated access backhaul relay scenario according to one or more embodiments. In one embodiment, an adaptation layer can be placed above the RLC layer at the IAB DUs. The adaptation layer can perform the tasks of routing of UE traffic across the multi-hop network, and aggregation of bearers from multiple UEs into common backhaul bearers. It should be noted that the depicted protocol stack for the full RLC layer, including the automatic repeat request (ARQ) functionality, resides at each IAB node. Thus, the RLC ARQ in this multi-hop relay network can be performed on a hop-by-hop basis.

The protocol stack shown on the UE side comprises a physical (PHY) layer, medium access control (MAC) layer, radio link control (RLC) layer, packet data convergence protocol (PDCP) and session data application protocol (SDAP) in the RAN protocol stack. The PDCP and SDAP are served from the UE to the IAB donor user plane central unit (CU-UP), where the PDCP and SDAP reside at the CU-UP on the network side. The IAB serving node goes up to the RLC. The protocol stack from the mobile termination (MT) of the serving IAB node to the DU of the IAB donor can comprise an adaption (adapt) layer. The adapt layer can perform a routing function from one IAB node to another IAB node, and it can perform the function of bearer aggregation.

Figure 5:
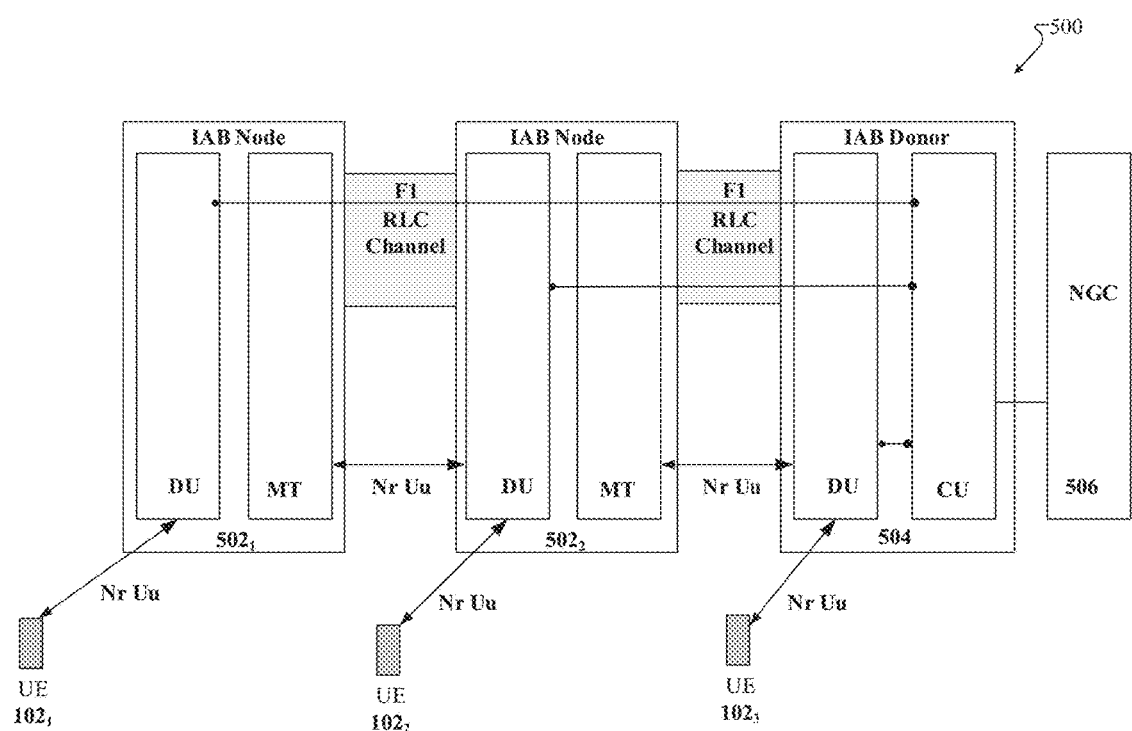
FIG. 5 illustrates an example schematic system block diagram of an integrated access backhaul architecture according to one or more embodiments.

Referring now to FIG. 5 illustrated is an example schematic system block diagram of an integrated access backhaul architecture according to one or more embodiments. Data from multiple UE bearers can be aggregated into common backhaul bearers that are established between two IAB nodes $502_1$, $502_2$. Such backhaul bearers can be referred to as RLC channels. Within an IAB network, IAB nodes $502_1$, $502_2$ can comprise a DU that can connect with the UEs $102_1$, $102_2$, $102_3$. The IAB nodes $502_1$, $502_2$ can also comprise an MT. Since the IAB node $502_1$ is a relay, it can talk to another IAB node $502_2$. Thus, an RLC channel can be established between an MT of an IAB node $502_1$ to a DU of another IAB node $502_2$, which forms the relay link for which the UE bearers and data can be transmitted. Thus, UEs $102_1$, $102_2$, $102_3$ can be attached to the IAB nodes $502_1$, $502_2$ to connect to a next generation core network (NGC) 506, via an IAB donor node 504, which can be connected to the NCG 506 through a wired interface. The IAB donor node 504 can comprise a central unit (CU). The RLC, MAC, and PHY can be in the DU and the PDCP and the SDAP can be in the CU (as depicted by FIG. 4). Additionally, the DU and the CU can be connected within the IAB Donor node 504 (e.g., base station). As depicted in FIG. 5, the CU can be connected to multiple DUs from various IAB nodes $502_1$, $502_2$, however, there can be only one CU that connects the data back to the NGC 506.

Figure 6:
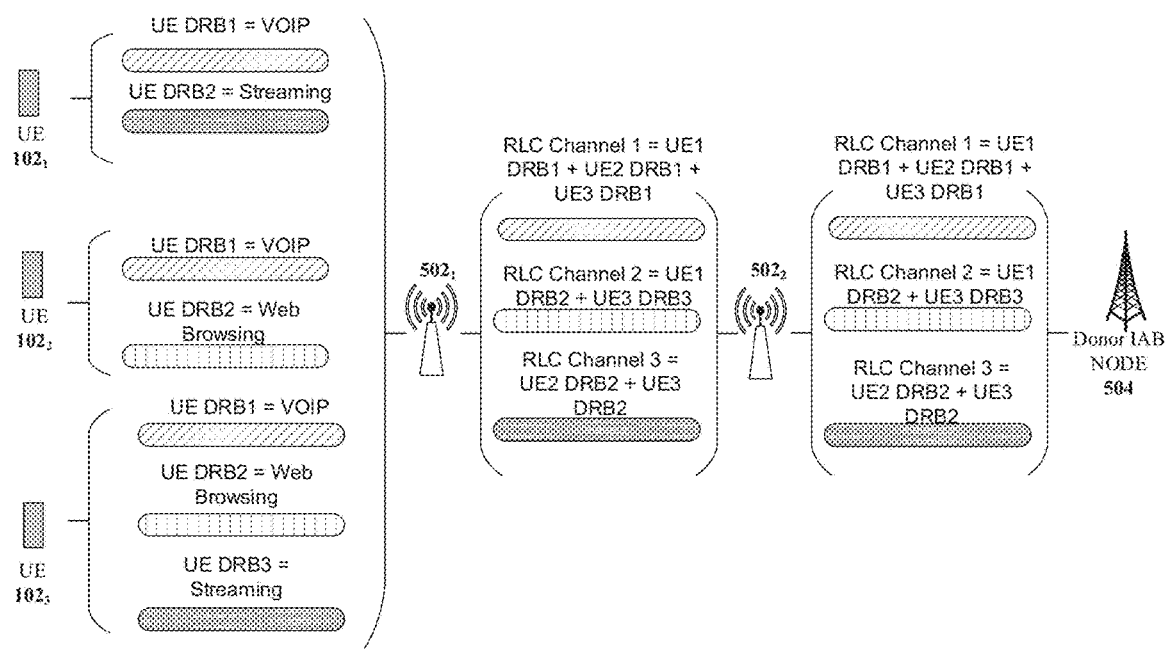
FIG. 6 illustrates an example schematic system block diagram of a quality of service bearer aggregation over backhaul links according to one or more embodiments.

Referring now to FIG. 6, illustrated is an example schematic system block diagram of a quality of service bearer aggregation over backhaul links according to one or more embodiments. FIG. 6 depicts the concept of aggregating multiple UE bearers into a backhaul bearer based on common QoS profiles.

As depicted in FIG. 6, the UE $102_1$ can have two bearers (e.g., voice over internet protocol (VOIP) and data streaming), the UE $102_2$ can have two bearers (e.g., VOIP and web browsing), and the UE $102_3$ can have three bearers (e.g., VOIP, web browsing, and data streaming). When the UEs $102_1$, $102_2$, $102_3$ connect to the first IAB node $502_1$, and the first IAB node needs to relay all of the data from the UEs $102_1$, $102_2$, $102_3$ to the second IAB node $502_2$, then the first IAB node $502_1$ can aggregate the VOIP bearer for all three UEs $102_1$, $102_2$, $102_3$ onto a single RLC channel based on the type of bearer. For example, RLC channel 1 can aggregate the VOIP data from all three UEs $102_1$, $102_2$, $102_3$, RLC channel 2 can aggregate the web browsing data from UEs $102_2$, $102_3$, and RLC channel 3 can aggregate the streaming data from UEs $102_1$, $102_3$. Alternatively, the aggregation can be based on QoS and/or routes. For example, if UE $102_1$, and UE $102_2$ have a similar data route, then their bearers (regardless of type of bearer) can be aggregated onto one RLC channel, and the bearer for UE $102_3$ can be placed a different RLC channel.

Figure 7:
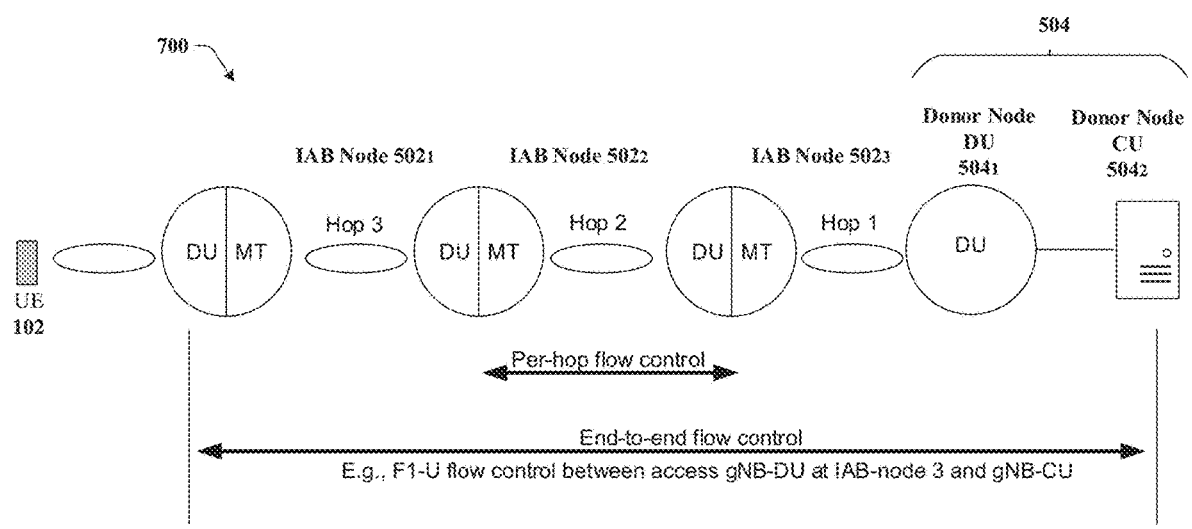
FIG. 7 illustrates an example schematic system block diagram of a flow control solution for an integrated access backhaul according to one or more embodiments.

Referring now to FIG. 7, illustrated is an example schematic system block diagram of a flow control solution for an integrated access backhaul according to one or more embodiments. There can be various flow control solutions specified to prevent congestion at IAB nodes. However, a couple of the main flow control candidates are depicted in FIG. 7. There could be a hop-by-hop flow control mechanism between IAB nodes $502_1$, $502_2$, $502_3$, or an end-to-end flow control mechanism between the access IAB node $502_1$ and the donor IAB node 504. Thus, bearer aggregation of UE 102 bearers can be performed based on routing information and flow control feedback, along with reconfiguration of already set up RLC channels or backhaul bearers based on mobility or radio resource management (RRM) events.

Figure 8:
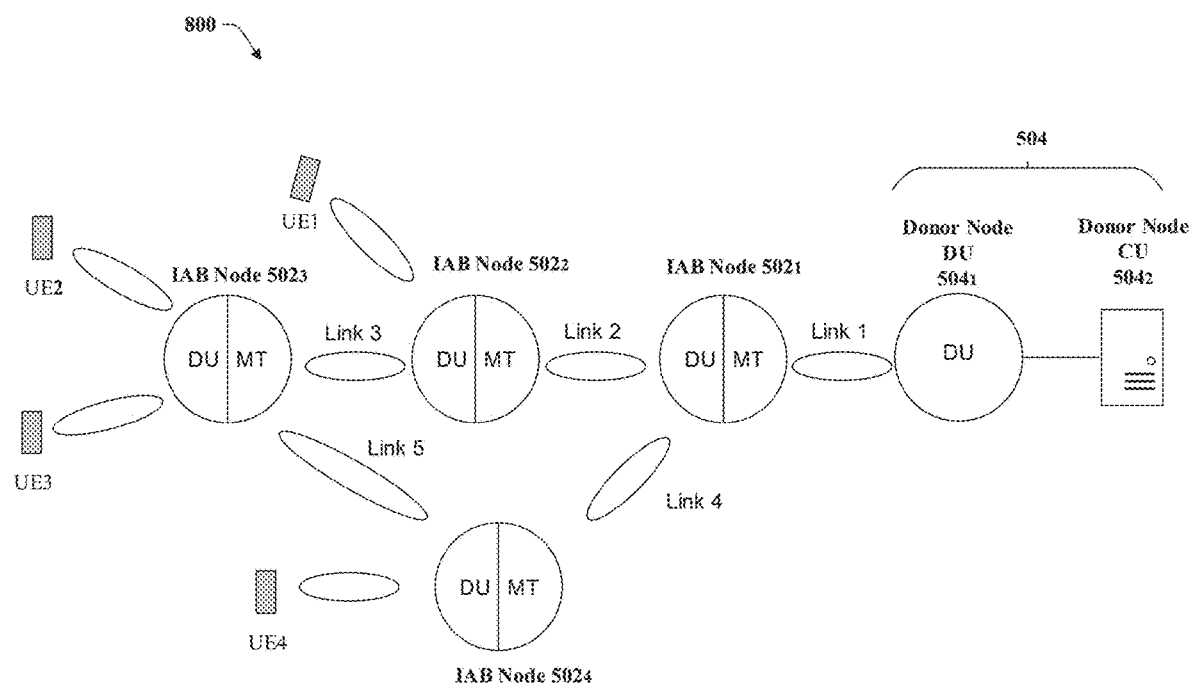
FIG. 8 illustrates an example schematic system block diagram of an integrated access backhaul network according to one or more embodiments.

Referring now to FIG. 8, illustrated is an example schematic system block diagram of an integrated access backhaul network according to one or more embodiments. The IAB network configuration depicted in FIG. 8 comprises four UEs (e.g., $102_1$, $102_2$, $102_3$ $102_4$) connected to an IAB network. The bearer for UE1 (e.g., $102_1$) can traverse two IAB links via IAB node 2 (e.g., $502_2$) and IAB node 1 (e.g., $502_1$) to reach the donor gNB-DU (e.g., 504). The bearers for UE2 (e.g., $102_2$) and UE3 (e.g., $102_3$) can traverse three IAB links via IAB node 3 (e.g., $502_3$), IAB node 2 (e.g., $502_2$), and IAB node 1 (e.g., $502_1$) to reach the donor gNB-DU (e.g., 504). Additionally, the UE bearer for UE4 (e.g., $102_4$) can traverse only two IAB links via IAB node 4 (e.g., $502_4$) and IAB node 1 (e.g., $502_1$) to reach the gNB-DU (e.g., 504). It should be noted that IAB node 3 (e.g., $502_3$) can also connect to IAB node 4. In the event of a link failure of link 3 between IAB node 3 (e.g., $502_3$) and IAB node 2 (e.g., $502_2$), traffic for UE2 and UE3 can be routed via IAB node 4 (e.g., $502_4$). For simplicity of discussion, assume that all UEs are performing services that require the same QoS class of bearers.

In the above described network example, under existing QoS-based bearer aggregation over backhaul bearers, for IAB link 1, the bearers for all three UEs (e.g., $102_1$, $102_2$, $102_3$) can be aggregated into the same backhaul bearer between IAB node 1 (e.g., $502_1$) and the gNB-DU (e.g., 504). However, under the proposed solution, the aggregation of UE bearers into backhaul bearers can be performed not only based on the QoS class of the aggregated bearers but also based on one of more factors, including routing information. One specific example of bearer aggregation based on a combination of routing information and QoS class is provided as follows: 1) bearers for UE2 (e.g., $102_2$) and UE3 (e.g., $102_3$) with the same QoS class can be aggregated into the same backhaul bearer over link 1, link 2, and link 3; 2) bearers with the same QoS class for UE1 and UE2 (e.g., $102_1$) can be aggregated into a separate backhaul bearer for link 2 and link 1; and 3) bearers with the same QoS class for UE4 (e.g., $102_4$) can be aggregated into separate backhaul bearers over link 4 and link 1. In order to perform bearer aggregation based on routing information, the routing information for each UE bearer can be provided to IAB nodes that are performing the bearer aggregation.

In another embodiment, a topology/routing entity in the network can enforce certain aggregation policies at the individual IAB nodes (via operations administration management (OAM) or cyclic prefix (CP) interface etc.). For example, the topology and/or routing entity can send enforcement policies to IAB nodes instructing which factors to consider when performing aggregation of bearers. Additionally, such enforcement policies can be modified over time based on network and traffic conditions. Furthermore, this can work in reverse. For example, in order to try and maintain certain QoS and/or scheduling performance, topology changes can be triggered to limit the degree of bearer aggregation in some cases (if certain links are identified as bottlenecks).

In yet another embodiment, assuming that the aggregated backhaul bearers are already set up in the way described in the first solution, then when there is a mobility event, the backhaul bearer aggregation can be reconfigured along various IAB links. For example, when UE3 (e.g., $102_3$) performs a handover from IAB node 3 (e.g., $502_3$) to IAB node 4 (e.g., $502_4$), UE3's (e.g., $102_3$) bearers that have the same QoS class as the bearers of UE4 (e.g., $102_4$), can now be aggregated into a common backhaul bearer over IAB link 4 and IAB link 1. Hence, the backhaul bearers that were already setup over IAB link 4 and link 1 for UE4 ($102_4$) can be reconfigured to add the bearers for UE3 (e.g., $102_3$). Moreover, the aggregated backhaul bearers that were set up over link 3, link 2, and link 1 to aggregated bearers from UE2 (e.g., $102_2$) and UE3 (e.g., $102_3$) can now be reconfigured to remove bearers for UE3 (e.g., $102_3$).

In another embodiment, when link 3 between IAB node 3 (e.g., $502_3$) and IAB node 2 (e.g., $502_2$) experiences poor radio frequency (RF) performance, the traffic to/from UE2 (e.g., $102_2$) and UE3 (e.g., $102_3$) bearers can experience a route change to traverse from IAB Node 3 to IAB Node 4 to IAB Node 1 (e.g., $502_1$) to gNB-DU (e.g., 504). As a result of this route change, the bearers for UE2 (e.g., $102_2$) and UE3 (e.g., $102_3$) can be aggregated into common backhaul bearers across UE2 (e.g., $102_2$), UE3 (e.g., $102_3$) and UE4 (e.g., $102_4$) over link 4 and link 1. It should be noted that in this example, a new aggregated backhaul bearer can be set up to aggregate bearers for UE2 (e.g., $102_2$) and UE3 (e.g., $102_3$) over a link 5. Additionally, the reconfiguration of aggregated backhaul bearers can also be performed to maintain certain performance metrics, such as QoS requirement of UE bearers, or some other network performance metrics.

Figure 9:
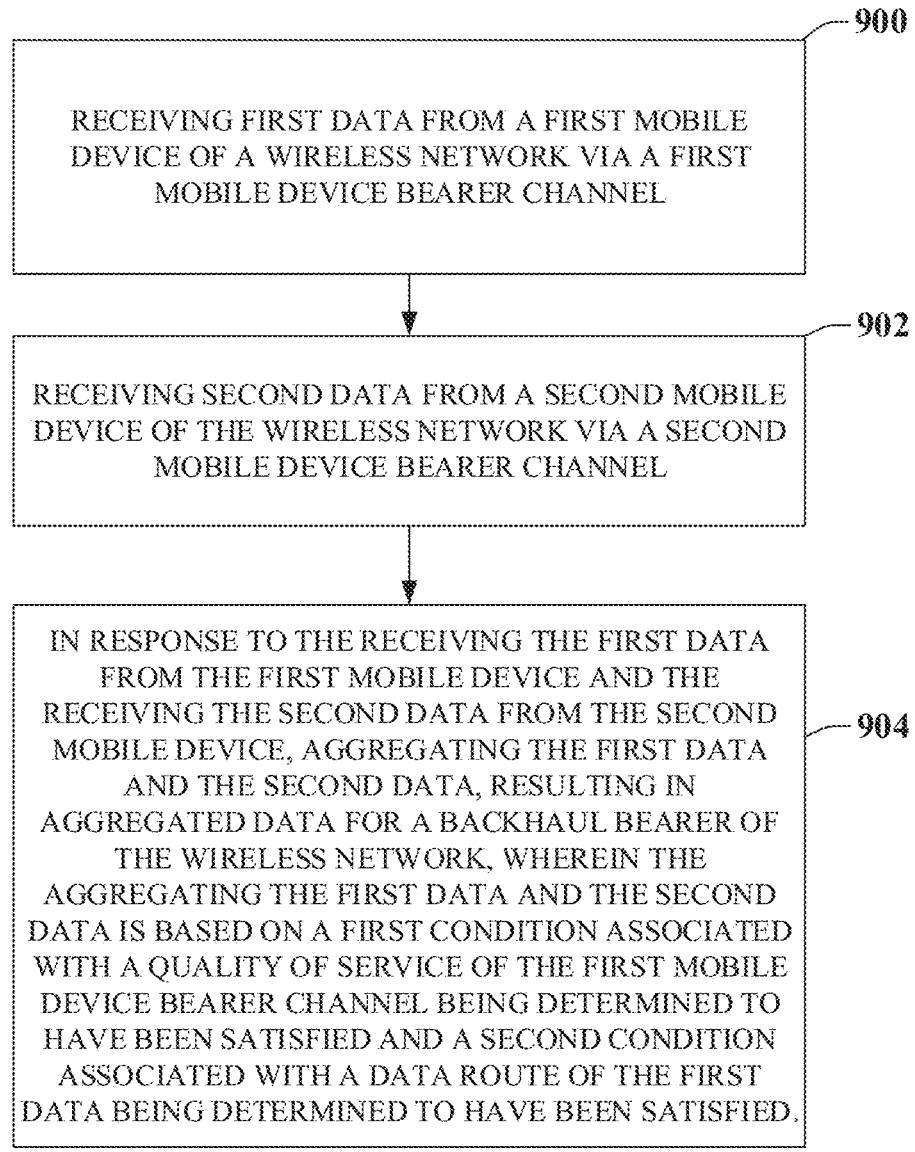
FIG. 9 illustrates an example flow diagram of a method that facilitates configuration and reconfiguration of aggregated backhaul bearers according to one or more embodiments.

Referring now to FIG. 9, illustrates an example flow diagram for facilitating configuration and reconfiguration of aggregated backhaul bearers. At element 900, a method can comprise receiving first data from a first mobile device (e.g., UE $102_1$) of a wireless network via a first mobile device bearer channel. At element 902, the method can comprise receiving second data from a second mobile device (e.g., UE $102_2$), of the wireless network via a second mobile device bearer channel. Additionally, at element 904, the method can comprise in response to the receiving the first data from the first mobile device (e.g., UE $102_1$) and the receiving the second data from the second mobile device (e.g., UE $102_2$), aggregating, by the wireless network device, the first data and the second data, resulting in aggregated data for a backhaul bearer of the wireless network, wherein the aggregating the first data and the second data is based on a first condition associated with a quality of service of the first mobile device (e.g., UE $102_1$) bearer channel being determined to have been satisfied and a second condition associated with a data route of the first data being determined to have been satisfied.

Figure 10:
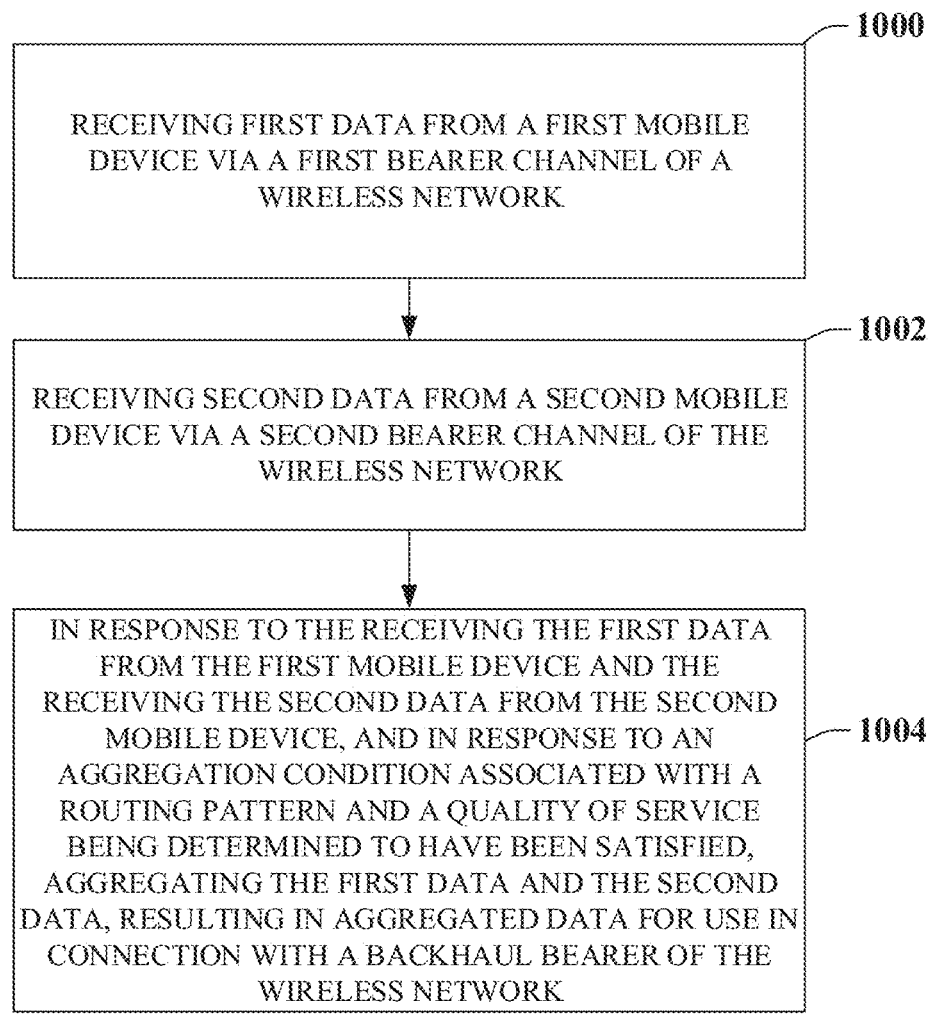
FIG. 10 illustrates an example flow diagram of a system that facilitates configuration and reconfiguration of aggregated backhaul bearers according to one or more embodiments.

Referring now to FIG. 10, illustrated is an example flow diagram for facilitating configuration and reconfiguration of aggregated backhaul bearers. At element 1000, a system can facilitate, receiving first data from a first mobile device (e.g., UE $102_1$) via a first bearer channel of a wireless network. At element 1002, the system can also comprise receiving second data from a second mobile device (e.g., UE $102_2$) via a second bearer channel of the wireless network. Additionally, in response to the receiving the first data from the first mobile device (e.g., UE $102_1$) and the receiving the second data from the second mobile device (e.g., UE $102_2$), and in response to an aggregation condition associated with a routing pattern and a quality of service being determined to have been satisfied, aggregating the first data and the second data, resulting in aggregated data for use in connection with a backhaul bearer of the wireless network at element 1004.

Figure 11:
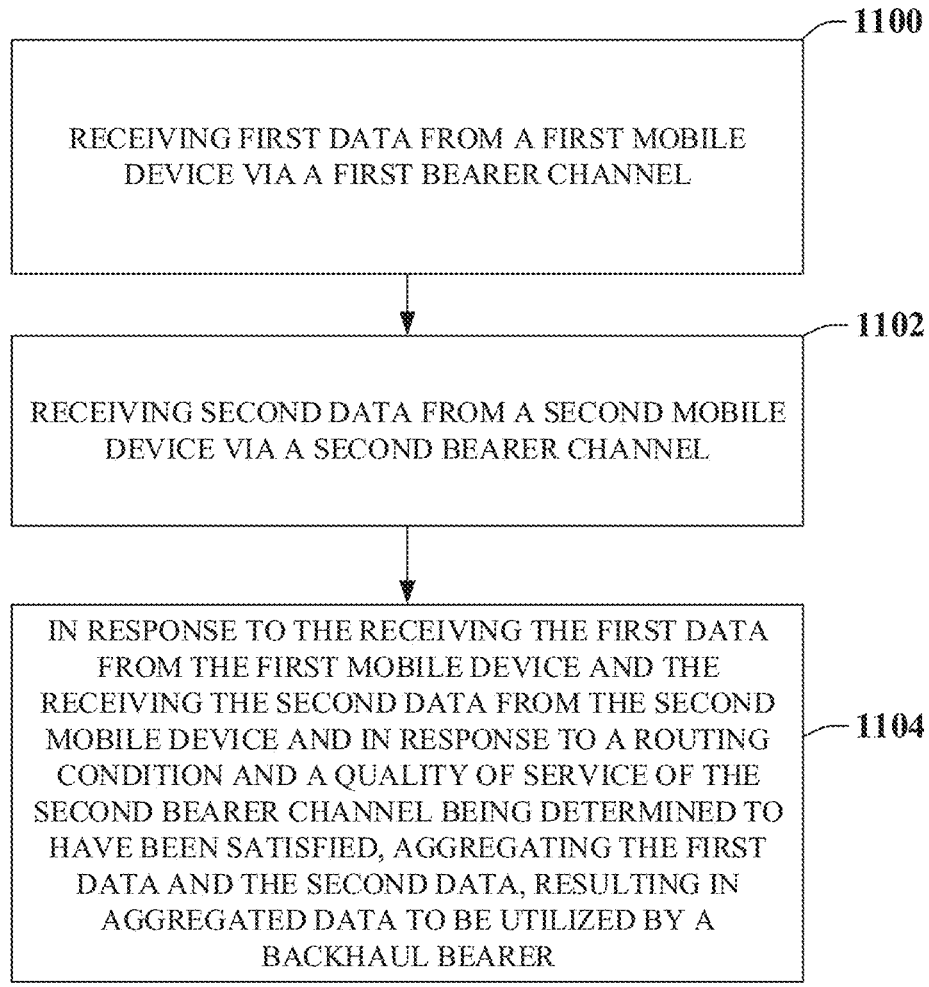
FIG. 11 illustrates an example flow diagram of a machine-readable medium that facilitates configuration and reconfiguration of aggregated backhaul bearers according to one or more embodiments.

Referring now to FIG. 11, illustrated is an example flow diagram for facilitating configuration and reconfiguration of aggregated backhaul bearers. At element 1100, a machine-readable medium can comprise receiving first data from a first mobile device (e.g., UE $102_1$) via a first bearer channel. At element 1102, the machine-readable storage medium can perform the operations comprising receiving second data from a second mobile device (e.g., UE $102_2$) via a second bearer channel. Furthermore, in response to the receiving the first data from the first mobile device (e.g., UE $102_1$) and the receiving the second data from the second mobile device (e.g., UE $102_2$) and in response to a routing condition and a quality of service of the second bearer channel being determined to have been satisfied, the machine-readable storage medium can perform the operations comprising aggregating the first data and the second data, resulting in aggregated data to be utilized by a backhaul bearer at element 1104.

Figure 12:
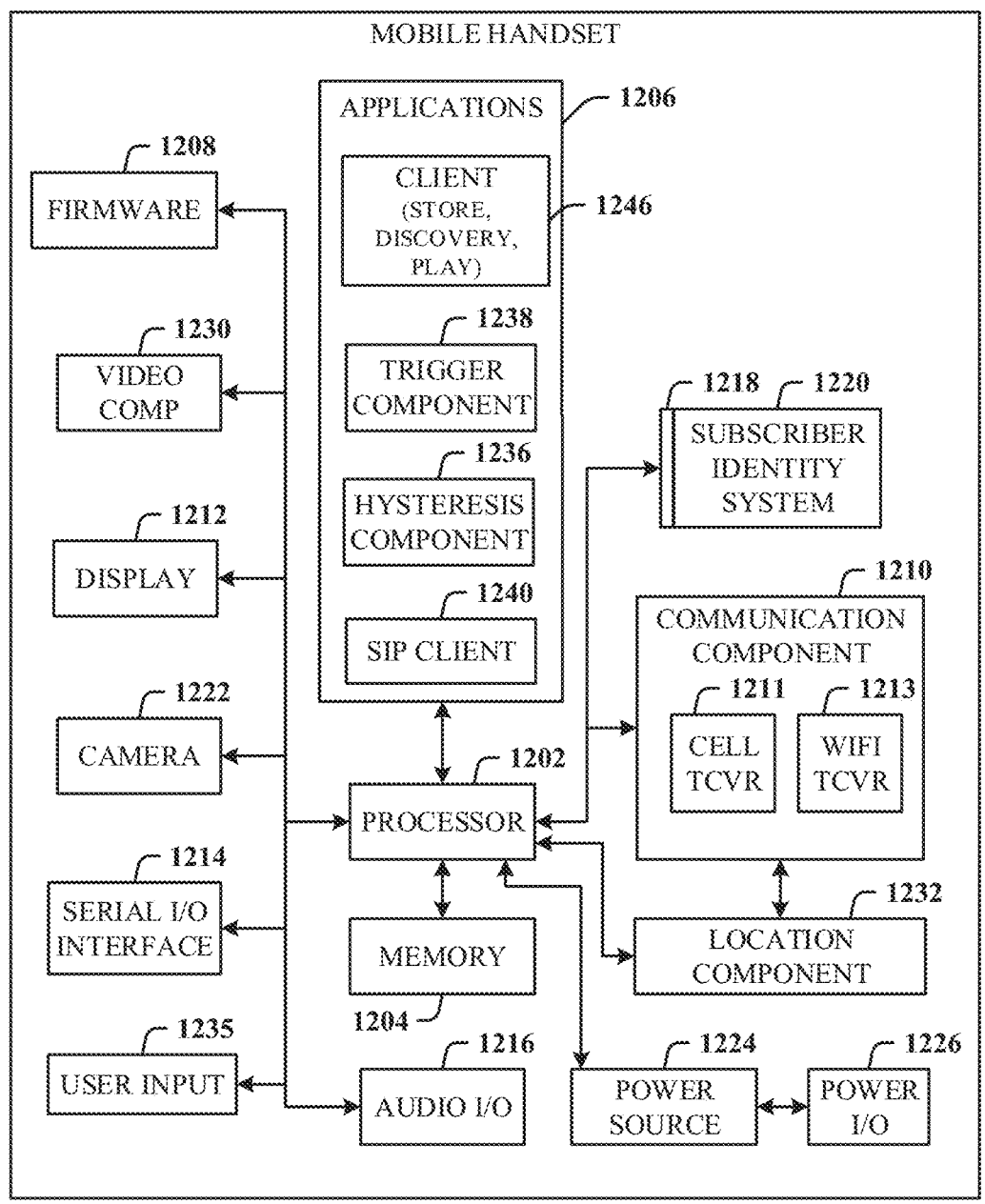
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
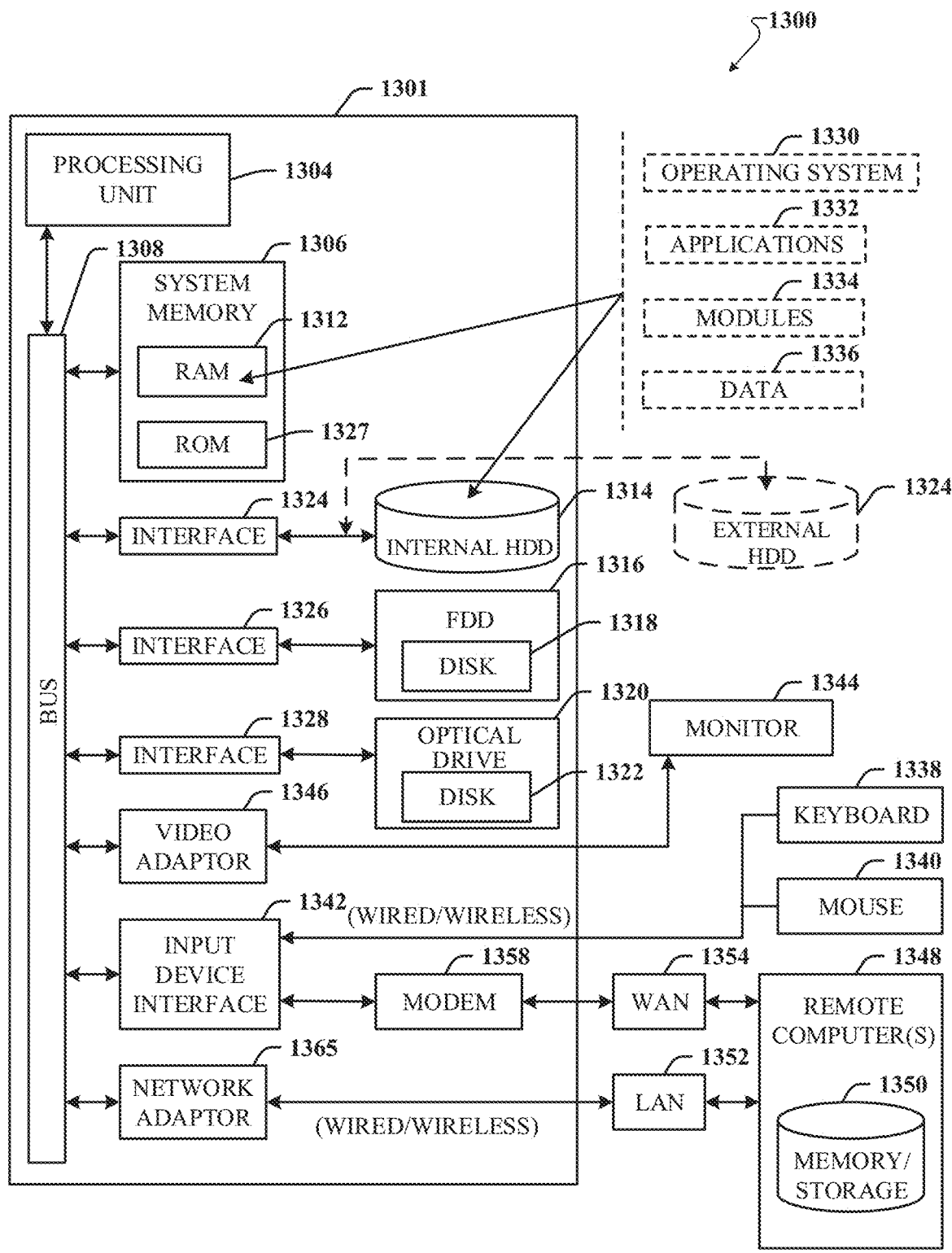
FIG. 13 illustrates an example block diagram of an example computer operable to engage in a system architecture that facilitates secure wireless communication according to one or more embodiments described herein.

Referring now to FIG. 13, there is illustrated a block diagram of a computer 1300 operable to execute a system architecture that facilitates establishing a transaction between an entity and a third party. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Current solutions do not consider other factors, such as routing information to decide which UE bearers can be aggregated into common backhaul bearers. This can cause problems when UE bearers for UE1 and UE2 are aggregated into a common backhaul bearer between the donor IAB node and IAB node 1. However, from IAB node 1 onwards, the two UE bearers can take different routes to reach UE1 and UE2 (assuming UE1 and UE2 are being served by different IAB nodes). In this case, if the route to UE1 is congested or has a poor link, any hop-by-hop flow control mechanism that operates on a per-RLC channel level between the donor IAB node and IAB node 1 can cause conflicting results for UE bearers 1 and 2. For example if the backhaul bearer is throttled based on detected congestion for UE bearer 1, it can unnecessarily punish UE bearer 2.

Current solutions for bearer aggregation do not address the need for bearer reconfiguration upon route changes or RRM events. For example, if UE bearers for UE1 and UE2 are aggregated into a common backhaul bearer between the donor IAB node and IAB node 1 because they follow a common route to the same access IAB node, and UE1 moves away to a different access IAB node, depending upon conditions, it can be better to reconfigure the UE bearers aggregated in to the backhaul channel (RLC channel) between donor IAB node and IAB node 1 to prevent the problem described.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by network equipment comprising a processor, first data from a first user equipment via a first user equipment bearer channel enabled via a network;
receiving, by the network equipment, second data from a second user equipment via a second user equipment bearer channel enabled via the network;
in response to a performance metric of the first user equipment bearer channel being determined to have been satisfied:
aggregating, by the network equipment, the first data and the second data, resulting in aggregated data for a backhaul bearer enabled via the network, and
initiating, by the network equipment, a network equipment topology modification to restrict aggregation of third data from a third user equipment with the aggregated data for the backhaul bearer to maintain the performance metric of the first user equipment bearer channel.

2. The method of claim 1, further comprising:
sending, by the network equipment, the aggregated data to be applied to the backhaul bearer.

3. The method of claim 1, wherein the aggregating is based on a condition is associated with a routing of the first data to the backhaul bearer being determined to have been satisfied.

4. The method of claim 1, further comprising:
receiving, by the network equipment, routing data representative of a route via which the first data is to be communicated.

5. The method of claim 1, further comprising:
receiving, by the network equipment, routing data representative of a first route via which the second data is to be communicated as an alternative to a second route of the routing data.

6. The method of claim 1, further comprising:
modifying, by the network equipment, the aggregated data based on a second quality of service, different than a first quality of service associated with the backhaul bearer.

7. The method of claim 1, further comprising:
receiving, by the network equipment, policy data representative of a policy to which the network equipment is to adhere, during the aggregating of the first data and the second data.

8. The method of claim 1, wherein aggregating the first data and the second data is further based on a second condition associated with a data route of the first data being determined to have been satisfied.

9. The method of claim 1, further comprising:
in response to a handover of the first data from first node equipment to second node equipment, reconfiguring, by the network equipment, the aggregated data to be further applied to the backhaul bearer.

10. The method of claim 1, further comprising:
limiting, by the network equipment, an amount of the first data and the second data to be aggregated according to the aggregating.

11. A system, comprising:
a processor; and
a memory that stores executable instructions that, when executed by the processor, facilitate performance of operations, comprising:
receiving first data from a first user equipment via a first network bearer channel;
receiving second data from a second user equipment via a second network bearer channel;
in response to a performance criterion associated with a routing pattern being determined to have been satisfied:
aggregating the first data and the second data, resulting in aggregated data for use in connection with a network backhaul bearer, and
triggering a network topology modification to restrict aggregation of third data from a third user equipment with the aggregated data for use in the connection with the network backhaul bearer to maintain a quality of service of the first user equipment bearer channel.

12. The system of claim 11, wherein the routing pattern is associated with a route of the first data.

13. The system of claim 11, wherein the operations further comprise:
sending route data representative of a route of the first data to integrated access backhaul node equipment to facilitate aggregating of the first data and the second data.

14. The system of claim 11, wherein the operations further comprise:
sending quality of service data representative of the quality of service to integrated access backhaul node equipment to facilitate aggregating of the first data and the second data.

15. A non-transitory machine-readable medium, comprising executable instructions that, when executed by a processor, facilitate performance of operations, comprising:
receiving first data from a first mobile device via a first bearer channel;
receiving second data from a second mobile device via a second bearer channel;
in response to a channel performance metric of the second bearer channel being determined to have been satisfied:
aggregating the first data and the second data, resulting in aggregated data to be utilized by a backhaul bearer,
modifying a topology to preclude aggregation of third data from a third mobile device with the aggregated data to be utilized by the backhaul bearer to maintain the channel performance metric of the second bearer channel.

16. The non-transitory machine-readable medium of claim 15, wherein a routing condition is associated with sending a first route of the first data and a second route of the second data to an integrated access backhaul node to facilitate the aggregating the first data and the second data.

17. The non-transitory machine-readable medium of claim 15, wherein the channel performance metric is a first channel performance metric, and wherein the aggregating is based on a second channel performance metric associated with the first bearer channel.

18. The non-transitory machine-readable medium of claim 17, wherein the operations further comprise:
in response to a condition associated with the second channel performance metric being determined to have been satisfied, reconfiguring the backhaul bearer by modifying the aggregated data.

19. The non-transitory machine-readable medium of claim 18, wherein reconfiguring the aggregated data comprises removing the first bearer channel from the aggregated data.

20. The non-transitory machine-readable medium of claim 15, wherein the operations further comprise:
sending the aggregated data to be utilized by the backhaul bearer.

* * * * *